Figure 1:
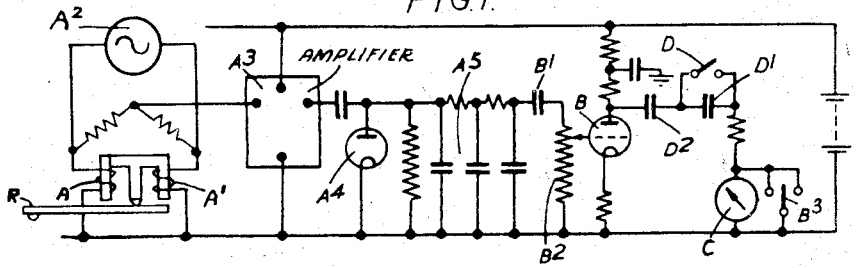

June 3, 1947.  R. E. REASON  2,421,578
APPARATUS FOR MEASURING THE DEGREE OF ROUGHNESS OF SURFACES
Filed Oct. 10, 1944  2 Sheets-Sheet 1

Inventor
RICHARD EDMUND REASON
By
Emery Holcombe & Blair
Attorney

June 3, 1947.  R. E. REASON  2,421,578
APPARATUS FOR MEASURING THE DEGREE OF ROUGHNESS OF SURFACES
Filed Oct. 10, 1944    2 Sheets-Sheet 2
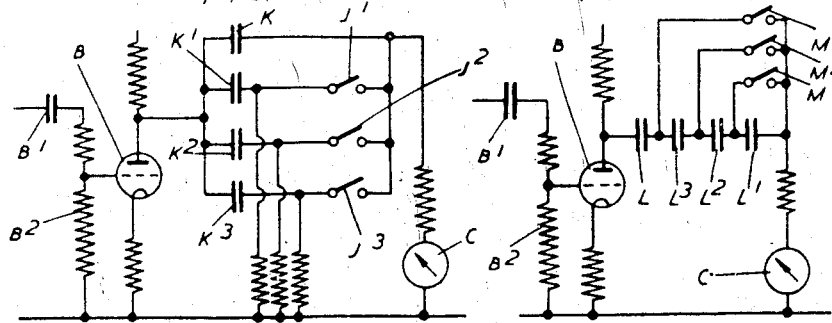
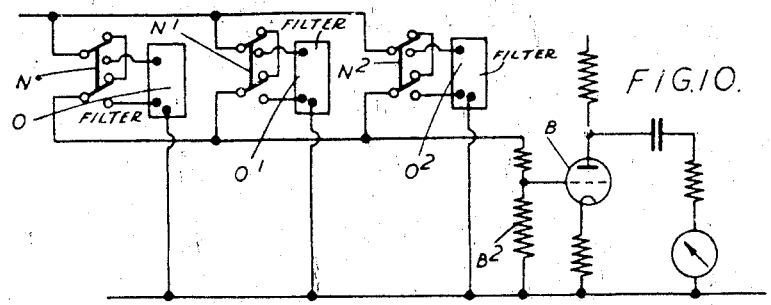
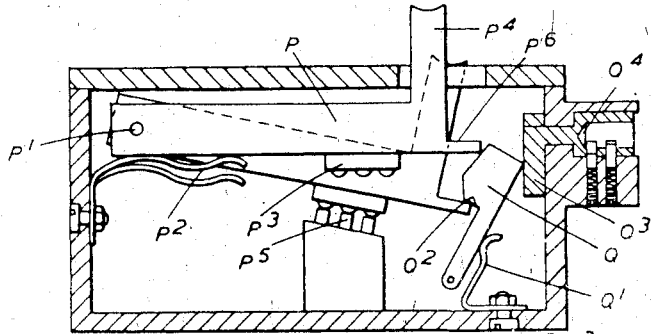
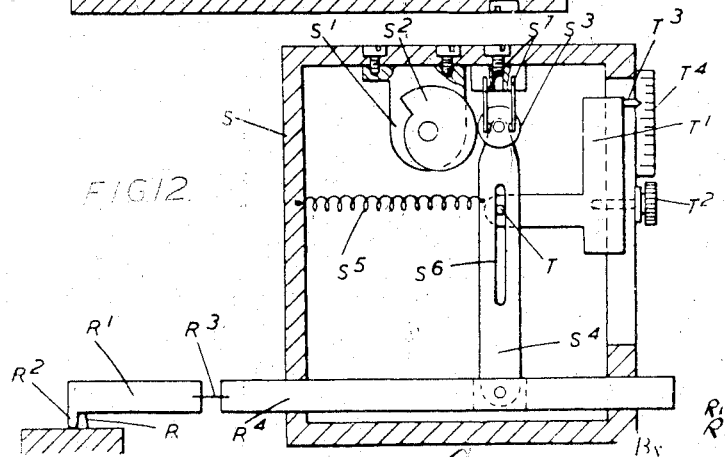
Inventor
RICHARD E. REASON
By Emery Holcombe & Blair
Attorney

UNITED STATES PATENT OFFICE 2,421,578

APPARATUS FOR MEASURING THE DEGREE OF ROUGHNESS OF SURFACES

Richard Edmund Reason, Leicester, England, assignor to Taylor, Taylor & Hobson Limited, Leicester, England, a company of Great Britain Application October 10, 1944, Serial No. 558,053
In Great Britain June 17, 1943

7 Claims. (Cl. 73—105)

This invention relates to apparatus for measuring surface roughness, of the kind in which a stylus is traversed over the surface under test and the movements of the stylus approximately normal to the surface are converted into electrical energy, by which a measuring instrument is operated to give a numerical indication representative of the degree of roughness of the surface. Such indication will hereinafter be termed an "average" reading.

The device used for converting the stylus movements into electrical energy may take various forms, but will usually have a small current or voltage output which requires considerable amplification before being applied to the measuring instrument. The frequency or frequencies of such current will depend on the wavelength or wavelengths of the surface undulations and on the speed of traverse of the stylus.

The wave form of the surface undulations will depend largely on the type of machine used for generating the surface. For example a turned surface may have a fairly simple and regular wave form due to the normal actions of the machine, whilst the wave form of a surface produced by grinding is often highly complex and irregular. In either case the normal wave form may be superimposed on a fairly simple undulation of considerably greater wavelength caused by vibration or other imperfections of the machine. It is usual to classify as "roughness," the surface undulations of shorter wavelength, whilst the undulations of longer wavelength are classified as "waviness." For instrumental purposes, it is necessary to select a critical wavelength to distinguish between the two. It is seldom practicable or desirable to include in the "average" measurement given by the metering instrument the effect of all the undulations of the surface regardless of wavelength, and in an apparatus designed to give a measure of the roughness of the surface, it is usual to exclude from the meter frequencies below a certain value, corresponding to the longer surface wavelengths. Thus, in theory, the apparatus by virtue of its cut-off frequency will provide a form of differentiation between roughness and waviness. In practice, however, such a desirable result is not always reliably obtained, and difficulties sometimes arise in cases where the amplitude of the nominally excluded waviness wavelengths is greater than or nearly as great as the amplitude of the roughness wavelengths. For the nature of the electrical circuits providing the cut-off frequency is such that they will reject only the sinusoidal components of the waviness undulations of wavelength longer than the cut-off wavelength. If a waviness undulation has a wave form far removed from sinusoidal, it can be analysed into a fundamental of relatively long wavelength and harmonics of shorter wavelengths corresponding to frequencies which are multiples of the frequency of the fundamental, and one or more of the harmonics may have a relatively large amplitude. Although the fundamental and possibly the first few harmonics may be properly excluded from the measurements owing to their long wavelength, the remaining harmonics below the critical wavelength value will not be excluded from the measurement. In such case the "average" measurement obtained will be determined not only by the true roughness undulations but also by some or all of the harmonics of the waviness undulations. Thus in cases where the harmonics (within the roughness range of wavelengths) of the waviness undulations are of considerable amplitude in comparison with the amplitude of the roughness undulations, the measurement will bear no useful relation to any visually demonstrable aspect of the surface and may be so misleading as to be of no practical value to the engineer. Such cases are fortunately not very common in practice, but it is important to be able to recognise them when they do occur.

The present invention has for its object to provide means whereby an indication can readily be obtained as to whether or not the surface under test is one for which the average reading given by the apparatus is likely to be misleading, and also, if desired, an indication as to the order of the wavelength and amplitude of the longer wavelength undulations actually present in the surface.

In the apparatus according to the invention means are provided whereby two or more "average" readings can be obtained, one of which constitutes the main average reading and is determined by a range of frequencies excluding those corresponding to the unwanted longer wavelengths, whilst the other or others constitute auxiliary average readings and are respectively determined by ranges of frequencies including portions of the range corresponding to the unwanted longer wavelengths. It is to be understood that the term "unwanted" is used only in the sense of "intended to be excluded from the main roughness average measurement," and does not imply that a measurement of these longer wavelengths would not be useful.

The range of wavelengths for the auxiliary reading or readings may exclude substantially the whole of (or at least the major portion of) the range of wavelengths for the main reading, or alternatively the range of wavelengths for the auxiliary reading or readings may include the whole of the range for the main reading in addition to a further range. In the former case the auxiliary readings will be influenced substantially only by the waviness undulations and will exclude the roughness undulations, whilst in the latter case the auxiliary readings will be influenced both by the roughness undulations and by (at least the important portion of) the waviness undulations. The latter arrangement has the especial advantage of providing two or more ranges of wave-length any of which can if desired be selected to represent the roughness reading. Thus the critical wavelength distinguishing roughness from waviness is not easy to choose, and, although it may be convenient to standardise an arbitrarily chosen critical wavelength for this purpose, it is sometimes advantageous to be able to select in a particular instance a critical wavelength other than such accepted standard. For example, a critical wavelength chosen for surfaces produced by, say, fine diamond turning, may not be the most suitable for surfaces produced by, say, coarse grinding.

If desired, there may be two or more meters, respectively connected up to give the individual readings, or alternatively a single meter may be used in turn for the readings, means being provided for effecting a change-over at will from one reading to another. Such change-over may be effected by switching means controlling the electrical circuits through which the current output of the detector device is transmitted to the meter, or alternatively by suitably varying the speed of the traversing movement of the stylus. With the latter arrangement it is preferable to vary the length of surface traversed to obtain the average reading simultaneously with the speed of traversing. In either case it may be convenient to interlock the change-over means with means for altering the sensitivity of the apparatus, in order to afford a simpler basis of comparison between the readings.

Figure 2:
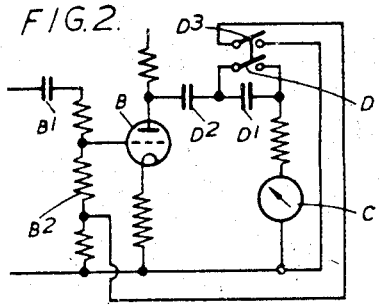
Figure 3:
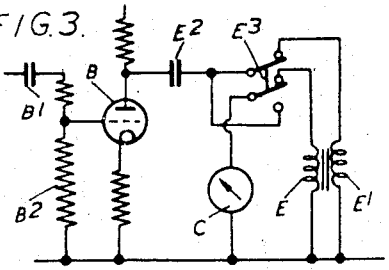
Figure 4:
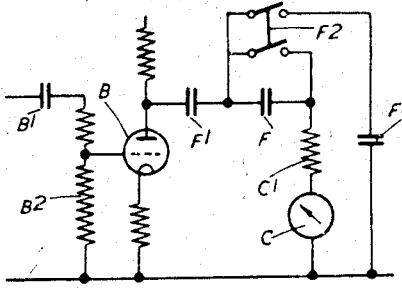
Figure 5:
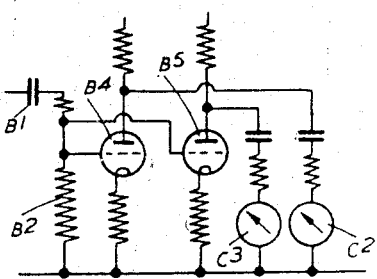
Figure 6:
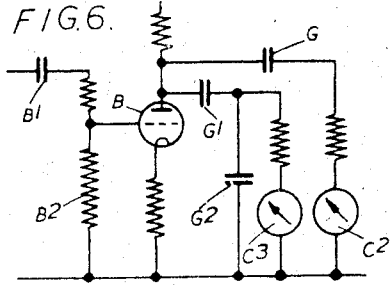
Figure 7:
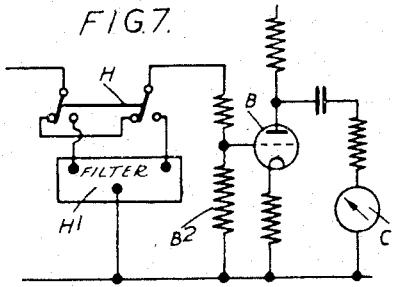

The invention may be carried into practice in various ways, but some convenient alternative arrangements according thereto are illustrated diagrammatically by way of example in the accompanying drawings, in which Figure 1 shows a simple arrangement employing a change-over switch for giving two ranges of frequency response to a single average meter, Figure 2 is a modification of the arrangement of Figure 1 in which the change-over switch also acts to vary the sensitivity of the apparatus, Figures 3 and 4 show two alternative change-over switch arrangements for obtaining two average readings from a single meter, Figures 5 and 6 show two alternative arrangements employing two meters, Figure 7 illustrates a further alternative employing a single meter, Figures 8–10 respectively show three alternative arrangements for obtaining a number of readings from a single meter, Figure 11 shows a convenient practical construction of multiple push-button switch for use in the arrangements of Figures 8–10, and Figure 12 illustrates one simple arrangement employing variable speed control for the traversing drive.

These arrangements can be employed with any convenient form of detector device for converting the working movements of the stylus approximately normal to the test surface into electrical energy and of transmission means for supplying the current output of such device, suitably amplified by an electronic valve amplifier, in a form suitable for energisation of an "average" meter, and Figure 1 shows one convenient arrangement of such apparatus by way of example. In this arrangement two detector coils $AA^1$, whose inductances are differentially controlled by the working movements of the stylus during its traverse over the surface under test, are connected in a simple bridge circuit fed from an oscillator $A^2$ generating current at a frequency high compared with the frequencies of the irregularities of the surface. The output from the bridge circuit is taken to a high frequency amplifier $A^3$, whose output is in turn rectified by a diode $A^4$ and passed through a filter circuit $A^5$ to the grid circuit of a low frequency amplifying valve B, whose anode circuit feeds the average meter C, preferably in the form of an integrating meter. The valve B is shown in the form of a thermionic triode, whose grid is supplied through a condenser $B^1$ with a shunt (or series) resistance $B^2$, whilst the average meter C in the anode circuit has capacity and resistance associated with it. The various alternatives are mainly concerned with the arrangement of this anode circuit. The meter also has associated with it contacts $B^3$ for cutting the meter in and out of circuit at the appropriate moments at the beginning and end of the traverse to provide the proper time interval for the desired average measurement. The circuit feeding the valve B are not shown in Figures 2–10, but it will be assumed for convenience that such circuits are arranged generally in the manner shown in Figure 1.

In the arrangement of Figure 1 a single average meter C is employed in conjunction with a change-over switch D for varying its range of frequency response. The change-over switch controls the capacity in series with the meter C, for example by acting when operated to short-circuit one $D^1$ of two condensers $D^1D^2$ in series in the meter circuit. Thus normally with the two condensers $D^1D^2$ in circuit, the apparatus is in condition to give the desired "average" roughness reading and has a cut-off frequency adjusted approximately at the value which corresponds to the arbitrarily chosen critical wavelength differentiating roughness from waviness. In practice there will usually not be a very sharp cut-off, and the curve of frequency response will be approximately flat-topped for the higher frequencies and will then fall away more or less gradually in the neighborhood of the critical frequency to a negligible value. It is convenient to specify the cut-off frequency as that at which the response is, say, 80% of the normal response for the higher frequencies. The critical wavelength, to which such cut-off frequency corresponds may conveniently be chosen between .01 and .10 inch and preferably between .02 and .04 inch.

When the change-over switch D is operated to short-circuit one condenser $D^1$, the capacity in series with the meter is increased from its normal value (which might for example be 2½ microfarads) to a higher value (of say 12 microfarads), and the effect of this change is to alter the cut-off frequency of the apparatus to a fraction (preferably considerably less than half) of its normal value. Thus the reading obtained on the average meter C will then include not only the roughness wavelengths but also a substantial portion of the waviness wavelengths.

If the second average reading, obtained with the change-over switch in its operated position, is greater than a certain limited percentage of the first or normal average reading, then the amount of waviness present in the surface may be such as to render the normal average reading meaningless as an indication of true roughness. The actual limiting percentage will depend to some extent on the nature of the whole apparatus, but an increase of 25% may be mentioned as a suitable limiting percentage to choose in some instances.

In order to eliminate risk of calculating errors in use, it will often be convenient to vary the gain of an amplifier when changing over from the first to the second reading. Thus assuming that 25% is in fact chosen as the limiting increase, then a decrease in the gain of the amplifier to about 0.8 times its normal value will enable a direct comparison of the two readings to be employed without need for any calculation, so that the normal reading will be acceptable as a roughness reading if the second reading is less than the normal reading, but will be unacceptable if the second reading is the greater of the two.

The control of the amplifier gain is preferably effected, as shown in Figure 2, by a second switch $D^3$ ganged with the main change-over switch D and acting to alter the gain in any convenient way, as for example by cutting out of circuit part of the resistance $B^2$ normally connected across the grid circuit of the valve B.

The second arrangement, shown in Figure 3, differs from the first in the manner in which operation of the change-over switch acts to shift the cut-off frequency value of the apparatus. In this arrangement the meter C is normally energised from the secondary E of a transformer whose primary $E^1$ is connected through a condenser $E^2$ to the valve anode circuit. Operation of the switch $E^3$, which is of the two-pole type, breaks both the primary and the secondary circuit of the transformer $EE^1$ and connects the meter C directly through the condenser $E^2$ to the anode circuit. This arrangement has the advantage that with suitable dimensioning of the parts a relatively sharp frequency cut-off can be obtained. The switch $E^3$ may also control variation of the gain of the amplifier as in the first arrangement.

The third arrangement (Figure 4) differs from the first two in that the second reading in this case substantially excludes the roughness range of frequencies, and has a cut-off at the upper end of its frequency range which approximately coincides with the normal frequency cut-off for the first reading. Actually, owing to the gradual cut-offs as above referred to, the differentiation between the two frequency ranges is not very sharp, but for practical purposes it can be taken that one range begins at the point where the other ends. In this arrangement there are normally two condensers $FF^1$ in series with the meter C, and the change-over switch $F^2$ acts to short-circuit one of them F and to connect in circuit a further condenser $F^3$ shunted across the meter C and its series resistance $C^1$. Here again the amplifier again may be varied by operation of the switch $F^2$ if desired.

In the foregoing arrangements a single meter is employed in conjunction with a change-over switch, but the arrangement may be such that two meters, one for each reading, are permanently connected in circuit, so that the two readings are simultaneously obtained from a single traverse of the stylus. This may be done in a variety of ways, and generally it may be said that any of the arrangements employing a change-over switch can readily be adapted for use with the two meters, the circuit of each meter corresponding to that in operation for the associated position of the switch. Two such arrangements are illustrated by way of example in Figures 5 and 6.

In the arrangement of Figure 5 (which corresponds to that of Figure 1) the two meters $C^2C^3$ are respectively fed from two low frequency amplifying valves $B^4B^5$ supplied in parallel from the previous circuits, each meter having the appropriate capacity and resistance in its circuit.

In the arrangement of Figure 6, which is the analogue of Figure 4, the two meters $C^2C^3$ are fed in parallel from a single amplifying valve B. One meter $C^2$ has a condenser G (corresponding to the two series condensers $FF^1$ of Figure 4) in series with it, whilst the other $C^3$ has one series condenser $G^1$ (corresponding to the condenser $F^1$ of Figure 4 alone) and one shunt condenser $G^2$ (corresponding to the condenser $F^3$ of Figure 4). The use of two meters is especially valuable in the arrangement of Figure 6, wherein the two readings are obtained from substantially non-overlapping frequency ranges, for in such case the two readings will in general give measurements representative respectively of the roughness and of the waviness of the surface.

It is not essential that the switch control should be effected on the output side of the low frequency amplifying valve, and Figure 7 shows an arrangement in which a change-over switch H acts to cut out a filter circuit $H^1$ in the grid circuit of the valve B. It will be clear that there is a wide variety of possible filtering arrangements which could be employed instead of that shown.

All the foregoing arrangements have been described as giving two average readings, but it will readily be appreciated that they can in general be extended to give three or more readings, thereby enabling much more information to be obtained as to the approximate wavelength and amplitude of the waviness undulations, the greater the number of readings, the more accurate the information obtained. Three such arrangements are shown by way of example in Figures 8–10.

In the arrangements of Figures 8 and 9, a single meter C is employed in conjunction with a number of switches $J^1J^2J^3$ each acting to vary the range of frequency response of the meter by controlling the capacity in series with the meter. For this purpose, in the arrangement of Figure 8, a number of suitably graded condensers $K^1K^2K^3$, each in series with one of the switches, are connected in shunt across a main condenser K in series with the meter, anti-surge resistances $K^4$ being provided. The arrangement of Figure 9 differs from tha of Figure 8 in that the condensers $L^1L^2L^3$ are all in series with the main condenser L in the meter circuit, the switches $M^1M^2M^3$ acting when operated to short-circuit one, two or three of the condensers.

Normally, in these two arrangements the apparatus is in condition to give the main average reading and has a cut-off frequency adjusted approximately at the value corresponding to the arbitrarily chosen critical wavelength differentiating roughness from waviness. When the first switch $J^1$ or $M^1$ is operated, the capacity in series with the meter is increased, thereby reducing the cut-off frequency. Thus the first auxiliary reading obtained will include not only the roughness wavelengths but also a portion of the waviness wavelengths. Operation of the second switch $J^2$ or $M^2$ will reduce still further the cut-off frequency, so that the second auxiliary reading will include a larger portion of the waviness wavelengths, and so on. If any one reading is substantially greater than a certain percentage of the previous reading (depending on the relation between the frequency ranges of the two readings), it will indicate that there is a waviness undulation in the surface having a wavelength within the added band for such reading. In order to give a direct comparison between the consecutive readings, each switch is preferably ganged with a further switch controlling the amplifier gain in the manner above described with reference to Figure 2.

It will thus be clear that by operating all the switches in turn and effecting a traversing movement after each operation, a rough general indication will be obtained of a position in the complete wavelength range of the waviness wavelengths of predominant amplitude, in addition to a rough indication of the amplitudes of the undulations. The series of auxiliary readings is also of considerable value in determining to what extent the main reading is reliable, and generally it may be said that, if the set of cut-off frequencies is properly chosen in view of harmonic relationships, substantial equality in successive readings (assuming that the switch operation also controls the amplifier gain) indicates that the readings will bear a demonstrable relationship to the visible characteristics of a graph of the surface.

Figure 10 shows the multi-switch analogue of Figure 7, wherein the change-over from one reading to another is controlled by switches $NN^1N^2$ in the circuits on the input side of the low frequency amplifying valve B, each switch acting to cut in or cut out one of a series of band-pass filter circuits $OO^1O^2$.

The arrangements of Figures 4, 5 and 6 can also be adapted to multi-switch operation, as will be immediately apparent without detailed description.

The various switches may be combined together, if desired, into a single multi-position switch, for example of the rotary type, or alternatively each switch may be, say, in the form of a spring-loaded push-button switch. It is preferable to provide means for ensuring that the operation of any one push-button will automatically release any other push-button which was at the moment depressed, and Figure 11 shows a convenient practical construction to this end.

In this construction, the moving member of each switch is in the form of a lever arm P pivoted about a common shaft $P^1$ and pressed upwardly by a spring $P^2$, the arm carrying a contact-operating member $P^3$, which acts when the arm is depressed by actuating the press-button $P^4$ to close or open spring contacts diagrammatically indicated at $P^5$. At its outer end the arm P has a finger $P^6$, which cooperates with a shaped bar Q common to all the switches. This arm Q is pressed by a spring $Q^1$ into its operative position, in which a shoulder $Q^2$ engages with the finger $P^6$ on any switch which has been depressed and thereby holds such switch in the operated position. When operating any switch, however, the finger $P^6$ on the switch forces the arm Q back, far enough to allow the finger to seat itself under the shoulder $Q^2$ and at the same time to release any already operated switch. The bar Q can be locked in position to prevent operation of any of the switches by means of a stop disc $Q^3$ mounted eccentrically on the rotary member of a lock $Q^4$ of the Yale type, to ensure that one selected reading only is available for use except by an authorised person having the key to the lock.

All the foregoing arrangements employ switch control to effect the change-over from one reading to another, but it is equally practicable to effect such change-over by varying the speed of the traversing movement. Figure 12 illustrates one simple arrangement of this kind. In this arrangement the stylus R is housed in a pick-up head $R^1$ having a skid $R^2$ resting on the surface, the pick-up head being pivoted at $R^3$ to a traversing bar $R^4$ mounted to slide longitudinally in a casing S. This casing S encloses an electric motor or other prime mover $S^1$ driving a cam $S^2$. A roller $S^3$ on the upper end of a lever $S^4$ is held in engagement with the cam $S^2$ by means of a spring $S^5$, the lower end of the lever $S^4$ being pivoted to the traversing bar $R^4$. The lever $S^4$ has a longitudinal slot $S^6$, in which engages a pin T constituting the fulcrum of the lever. This pivot pin T is adjustable along the slot $S^6$ by means of a slide $T^1$, which can be clamped to the casing S in any position of adjustment by means of the clamping screw $T^2$. An index $T^3$ on the slide $T^1$ cooperates with a scale $T^4$ on the casing to indicate which of the readings will be given by the single meter in the particular position of adjustment of the fulcrum pin T. The upper end of the lever $S^4$ serves to operate contacts $S^7$ for cutting in and out the meter, these contacts corresponding to the contacts $B^3$ of Figure 1.

In this arrangement one revolution of the cam $S^2$ corresponds to one traversing movement, the stylus being returned by the spring $S^5$ to its starting position ready for the new traverse, each time the main controlling switch is operated to initiate the traverse. It will be clear that with the particular arrangement illustrated, or indeed with any arrangement in which the variable speed control is effective between the cam and the stylus, the distance traversed by the stylus along the surface will automatically vary with the speed of traverse. This feature is advantageous, since it is desirable that the length of traverse should be several times the longest wavelengths transmitted to the meter. In alternative variable speed-control arrangements, wherein this feature is not provided automatically, it is preferable to provide means, such as adjustable limit switches, to ensure that the length of traverse will be increased with increased speed of traverse.

The nature of the electrical circuits for use with such variable speed control will be readily apparent, but it may be mentioned that a circuit generally similar to that described with reference to Figure 7 (omitting the change-over switch H) may be used. If the filter is of the high-pass type, increasing the speed of traverse will simply increase the wavelength range transmitted at the long wavelength end of the range. If, however, a band-pass filter is used and the ratio of its terminal frequencies is made as that between successive increases in the speed of traverse, then a series of readings will be obtained relating to successive but substantially non-overlapping wavelength bands.

It will be appreciated that the above arrangements have been given by way of example only and may be modified in a variety of ways within the scope of the invention.

What I claim as my invention and desire to secure by Letters Patent is:

1. Measuring or indicating apparatus for giving an average reading representative of the degree of roughness of a surface, comprises a stylus which is traversed over the surface, a detector device for converting the working movements of the stylus approximately normal to the surface into electrical energy, a single indicating meter, alternative filter devices having different frequency-response characteristics, electrical circuits connecting the detector device to the meter through one of said filter devices whereby the meter is caused to give a main average reading of the surface roughness determined by a range of frequencies including those corresponding to the roughness wavelengths but excluding those corresponding to the unwanted longer wavelengths, and switching means for changing over to another of said filter devices in the electrical circuits whereby the meter can be caused to give an auxiliary average reading determined by a range of frequencies including a portion of the range corresponding to such unwanted longer wavelengths.

2. Measuring or indicating apparatus for giving an average reading representative of the degree of roughness of a surface, comprises a stylus which is traversed over the surface, a detector device for converting the working movements of the stylus approximately normal to the surface into electrical energy, a single indicating meter, alternative filter devices having different frequency-response characteristics, electrical circuits connecting the detector device to the meter through one of said filter devices whereby the meter is caused to give a main average reading of the surface roughness determined by a range of frequencies including those corresponding to the roughness wavelengths but excluding those corresponding to the unwanted longer wavelengths, and a plurality of switches selectively controlling the connection of the electric circuits to the other filter devices whereby the meter can be caused to give any one of a number of auxiliary average readings determined by ranges of frequency which respectively include different portions of the range corresponding to the unwanted longer wavelengths in addition to the range included in the main reading.

3. The combination with the features claimed in claim 2, of means for interlocking the switches with one another whereby not more than one switch can be in the operative position at any one time.

4. Measuring or indicating apparatus for giving an average reading representative of the degree of roughness of a surface, comprises a stylus which is traversed over the surface, a detector device for converting the working movements of the stylus approximately normal to the surface into electrical energy, a meter, alternative filter devices having different frequency-response characteristics, an amplifier, electrical circuits connecting the detector device through the amplifier and through one of said filter devices to the meter whereby the meter is caused to give an average reading, switching means controlling the connection of the electric circuits to the other filter devices whereby the range of wavelengths in the irregularities of the surface included in the average reading can be varied at will, and means interlocked with such switching means for varying the gain of the amplifier to suit the different wavelength ranges.

5. Measuring or indicating apparatus for giving an average reading representative of the degree of roughness of a surface comprising a stylus which is traversed over a surface, a detector device actuated by the stylus for converting the working movements of the stylus approximately normal to the surface into electrical energy, a plurality of meters, a plurality of filter devices each electrically connected with one of the said meters and having different frequency-responsive characteristics, and electrical circuits connecting the detector device to the said meters through the said filter devices, whereby the said meters give average readings determined by different frequency ranges one of which ranges includes roughness wave-lengths but excludes unwanted wave-lengths.

6. Measuring or indicating apparatus for giving an average reading representative of the degree of roughness of a surface, comprising a stylus which is traversed over the surface, a detector device for converting the working movements of the stylus aproximately normal to the surface into electrical energy, electrically operated indicating means, means arranged to deliver electrical energy from the detector device to the indicating means for operating said means to give an average reading, means for varying the speed of traversing of the stylus whereby the range of frequencies included in the average reading can be made to correspond to any one of a plurality of wave-length ranges in the irregularities of the surface, and means for varying the distance traversed by the stylus for the average reading simultaneously with the speed of traverse.

7. Measuring or indicating apparatus for giving an average reading representative of the degree of roughness of a surface, comprising a stylus which is traversed over the surface, a detector device for converting the working movements of the stylus approximately normal to the surface into electrical energy, electrically operated indicating means, means arranged to deliver electrical energy from the detector device to the indicating means for operating said means to give an average reading, means for varying the speed of traversing of the stylus whereby the range of frequencies included in the average reading can be made to correspond to any one of a plurality of wave-length ranges in the irregularities of the surface, means for varying the distance traversed by the stylus for the average reading simultaneously with the speed of traverse, and means whereby the gain of the amplifier can be varied to suit the different wavelength ranges.

RICHARD EDMUND REASON.

REFERENCES CITED

The following references are of record in the file of this patent:

UNITED STATES PATENTS

| Number | Name | Date |
| --- | --- | --- |
| 2,240,278 | Abbott | Apr. 29, 1941 |
| 2,171,433 | Powers | Aug. 29, 1939 |

FOREIGN PATENTS

| Number | Country | Date |
| --- | --- | --- |
| 539,271 | Great Britain | Sept. 3, 1941 |
| 539,272 | Great Britain | Sept. 3, 1941 |